United States Patent
Wigren et al.

(10) Patent No.: US 12,010,627 B2
(45) Date of Patent: Jun. 11, 2024

(54) UPLINK POWER CONTROL OF A TERMINAL DEVICE

(71) Applicant: Telefonaktiebolaget LM Ericsson (publ), Stockholm (SE)

(72) Inventors: Torbjörn Wigren, Uppsala (SE); Petter Blomberg, Spånga (SE); Christer Törnevik, Solna (SE); Mikael Wittberg, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 308 days.

(21) Appl. No.: 17/595,973

(22) PCT Filed: Jun. 10, 2019

(86) PCT No.: PCT/SE2019/050532
§ 371 (c)(1),
(2) Date: Nov. 30, 2021

(87) PCT Pub. No.: WO2020/251426
PCT Pub. Date: Dec. 17, 2020

(65) Prior Publication Data
US 2022/0264473 A1 Aug. 18, 2022

(51) Int. Cl.
*H04W 52/14* (2009.01)
*H04W 52/36* (2009.01)

(52) U.S. Cl.
CPC ....... *H04W 52/146* (2013.01); *H04W 52/367* (2013.01)

(58) Field of Classification Search
CPC ............. H04W 52/146; H04W 52/367; H04W 52/365; H04W 52/40; H04W 52/30;
(Continued)

(56) References Cited

U.S. PATENT DOCUMENTS

2006/0212737 A1* 9/2006 Chandra ........... H02M 7/53871
713/340
2016/0183203 A1* 6/2016 Larsson .............. H04W 52/241
370/329
(Continued)

FOREIGN PATENT DOCUMENTS

EP       2571320 A1    3/2013
WO    2015047184 A1    4/2015

OTHER PUBLICATIONS

International Search Report and Written Opinion for Application No. PCT/SE2019/050532, dated Feb. 28, 2020, 13 pages.
(Continued)

*Primary Examiner* — Angelica Perez
(74) *Attorney, Agent, or Firm* — Nicholson De Vos Webster & Elliott LLP

(57) ABSTRACT

Mechanisms are provided for uplink power control of a terminal device. A method is performed in a network serving the terminal device. The method comprises estimating average total uplink transmit power for the terminal device. The method comprises determining a dynamic power threshold from the average total uplink transmit power according to a back-off power control loop. In the back-off power control loop, a setpoint value of total average transmission power is compared with a value of the estimated average total uplink transmit power. The method comprises setting a value of a power regulating parameter as function of the dynamic power threshold. The method comprises providing the value of the power regulating parameter to the terminal device for uplink power control of the terminal device.

16 Claims, 8 Drawing Sheets

(58) Field of Classification Search
CPC . H04W 52/36; H04B 7/18541; H04B 36/362; H04B 2201/698; H04B 17/382; H04B 36/13
See application file for complete search history.

(56) References Cited

U.S. PATENT DOCUMENTS

2017/0064641 A1* 3/2017 Logan ................. H04W 52/367
2020/0314764 A1* 10/2020 Noh .................... H04W 52/146

OTHER PUBLICATIONS

3GPP TS 38.213 V15.5.0, "3rd Generation Partnership Project; Technical Specification Group Radio Access Network; NR; Physical layer procedures for control (Release 15)," Mar. 2019, 104 pages, 3GPP Organizational Partners.
3GPP TS 38.331 V15.5.1, "3rd Generation Partnership Project; Technical Specification Group Radio Access Network; NR; Radio Resource Control (RRC) protocol specification (Release 15)," Apr. 2019, 491 pages, 3GPP Organizational Partners.
Communication pursuant to Article 94(3) EPC, App. No. EP19733569.8, May 16, 2023, 3 pages.
International Preliminary Report on Patentability, App. No. PCT/SE2019/050532, Dec. 23, 2021, 10 pages.

* cited by examiner

UPLINK POWER CONTROL OF A TERMINAL DEVICE

CROSS-REFERENCE TO RELATED APPLICATIONS

This application is a National stage of International Application No. PCT/SE2019/050532, filed Jun. 10, 2019, which is hereby incorporated by reference.

TECHNICAL FIELD

Embodiments presented herein relate to methods, a radio access network node, a terminal device, computer programs, and a computer program product for uplink power control of the terminal device.

BACKGROUND

When any radio equipment is to be deployed, regulatory radio frequency (RF) electromagnetic field (EMF) exposure requirements should be accounted for. These RF EMF exposure regulations may typically be based on the guidelines from the International Commission on Non-Ionizing Radiation Protection (ICNIRP) but may take different forms in some countries and regions. The aim of RF EMF exposure regulations is to ensure that human exposure to RF energy is kept within prescribed limits, which typically have been set with wide safety margins. These requirements apply for all radio transmitting equipment, in the cellular field primarily to base stations and terminal devices, such as user equipment (UE).

Some newly developed base stations and other radio equipment are equipped with so-called advanced antenna systems (AAS). These antenna systems increase the capacity and/or coverage compared to traditionally used antenna system by addition of one or more antenna arrays. In turn, this enables the simultaneous transmission of parallel data streams between a base station on the network side and a terminal device at the user-side by means of so-called multiple-input-multiple-output (MIMO) transmission. MIMO technology therefore benefits also from AASs applied at the terminal device side, for reception and transmission.

For radio base stations and other radio equipment having AAS systems with a large number of antenna elements in order to achieve a high directivity, there may be a large maximum beamforming gain. A consequence of a large beamforming gain is typically that the radiated power is concentrated in directional beams, meaning that the Equivalent Isotropic Radiated Power (EIRP) rating of the base station, i.e. the power radiated from an antenna with unity antenna gain in all directions, is increased as compared to the situation without AAS systems.

The basic restrictions of RF EMF exposure are specified in terms of specific absorption rate (SAR) or incident power density depending on frequency. In the ICNIRP guidelines, the transition frequency from SAR to power density is at 10 GHz, while the US Federal Communication Commission (FCC) applies a transition frequency of 6 GHz. For practical exposure assessments, particularly below 10 GHz, ICNIRP also specifies reference levels in terms of electric and magnetic field strengths or plane-wave equivalent power density. The reference levels, derived for maximum coupling conditions and applicable mainly for far-field conditions, are to be assessed in free space without presence of the exposed individual and are typically applied for base stations. Since power density is proportional to the EIRP in the far-field, the EIRP can be used to determine the power density.

For UEs, below 6 GHz (FCC) or 10 GHz (ICNIRP), the commonly applied maximum average UE transmit power levels of 21-24 dBm result in maximum SAR levels that are below the SAR limits. At frequencies above 6 GHz (FCC) and 10 GHz (ICNIRP), power levels of the same order are assumed to allow compliance with the exposure limits expressed as incidence power density values.

The ICNIRP and other RF EMF exposure limitations for UEs are usually expressed in terms of average values over a specified averaging time interval T. This means that the momentary transmit power (or EIRP) of the UE can, in principle, be higher that the maximum average power (e.g. 23 dBm) during a shorter time than T, as long as the time-averaged SAR or power density over any time period T is below the specified regulatory limit. To use a momentary transmit power for a UE that is higher than a level that ensures compliance with the RF EMF limits, the time-averaged total transmitted power of the UE needs to be controlled to be less than this level.

Average power is used in the description of the invention, rather than EIRP. However, the maximum EIRP is equal to the maximum transmit power multiplied with the maximum beam gain of the radio equipment.

Hence, there may be a need for efficient control of the average power or EIRP for user equipment, here also denoted terminal devices.

SUMMARY

An object of embodiments herein is to provide efficient power control of terminal devices that perform radio transmission in the uplink.

This objective is generally solved by mechanisms performed by at least one radio access network configured to uplink power control of a terminal device.

According to a first aspect there is presented a method for uplink power control of a terminal device. The method is performed in a network serving the terminal device. The method comprises estimating average total uplink transmit power for the terminal device. The method comprises determining a dynamic power threshold from the average total uplink transmit power according to a back-off power control loop. In the back-off power control loop, a setpoint value of total average transmission power is compared with a value of the estimated average total uplink transmit power. The method comprises setting a value of a power regulating parameter as a function of the dynamic power threshold. The method comprises providing the value of the power regulating parameter to the terminal device for uplink power control of the terminal device.

According to a second aspect there is presented a radio access network node for uplink power control of a terminal device. The radio access network node comprises processing circuitry. The processing circuitry is configured to cause the radio access network node to estimate average total uplink transmit power for the terminal device. The processing circuitry is configured to cause the radio access network node to determine a dynamic power threshold from the average total uplink transmit power according to a back-off power control loop. In the back-off power control loop, a setpoint value of total average transmission power is compared with a value of the estimated average total uplink transmit power. The processing circuitry is configured to cause the radio access network node to set a value of a power regulating parameter as a function of the dynamic power threshold. The processing circuitry is configured to cause the radio access network node to provide the value of the power regulating parameter to the terminal device for uplink power control of the terminal device.

According to a third aspect there is presented a radio access network node for uplink power control of a terminal device. The radio access network node comprises an estimate module configured to estimate average total uplink transmit power for the terminal device. The radio access network node comprises a determine module configured to determine a dynamic power threshold from the average total uplink transmit power according to a back-off power control loop. In the back-off power control loop, a setpoint value of total average transmission power is compared with a value of the estimated average total uplink transmit power. The radio access network node comprises a set module configured to set a value of a power regulating parameter as a function of the dynamic power threshold. The radio access network node comprises a provide module configured to provide the value of the power regulating parameter to the terminal device for uplink power control of the terminal device.

According to a fourth aspect there is presented a computer program for uplink power control of a terminal device. The computer program comprises computer program code which, when run on processing circuitry of at least one radio access network node, causes the at least one radio access network node to perform a method according to the first aspect.

The objective is generally further solved by mechanisms performed by a terminal device configured to uplink power control of the terminal device.

According to a fifth aspect there is presented a method for uplink power control of a terminal device. The method is performed by the terminal device. The method comprises providing, to a network serving the terminal device, a power headroom value for uplink transmission for the terminal device representing a value of momentary uplink transmit power of the terminal device. The method comprises obtaining, from the network, a value of a power regulating parameter. The method comprises performing uplink power control of the terminal device according to the power regulating parameter whereby the total momentary transmission power of the terminal device is limited in accordance with the value of the power regulating parameter.

According to a sixth aspect there is presented a terminal device for uplink power control of the terminal device. The terminal device comprises processing circuitry. The processing circuitry is configured to cause the terminal device to provide, to a network serving the terminal device, a power headroom value for uplink transmission for the terminal device representing a value of momentary uplink transmit power of the terminal device. The processing circuitry is configured to cause the terminal device to obtain, from the network, a value of a power regulating parameter. The processing circuitry is configured to cause the terminal device to perform uplink power control of the terminal device according to the power regulating parameter whereby total momentary transmission power of the terminal device is limited in accordance with the value of the power regulating parameter.

According to a seventh aspect there is presented a terminal device for uplink power control of the terminal device. The terminal device comprises a provide module configured to provide, to a network serving the terminal device, a power headroom value for uplink transmission for the terminal device representing a value of momentary uplink transmit power of the terminal device. The terminal device comprises an obtain module configured to obtain, from the network, a value of a power regulating parameter. The terminal device comprises a control module configured to perform uplink power control of the terminal device according to the power regulating parameter whereby total momentary transmission power of the terminal device is limited in accordance with the value of the power regulating parameter.

According to an eight aspect there is presented a computer program for uplink power control of a terminal device, the computer program comprising computer program code which, when run on processing circuitry of the terminal device, causes the terminal device to perform a method according to the fifth aspect.

According to a ninth aspect there is presented a computer program product comprising a computer program according to at least one of the fourth aspect and the eight aspect and a computer readable storage medium on which the computer program is stored. The computer readable storage medium could be a non-transitory computer readable storage medium.

Advantageously these methods, these radio access network nodes, these terminal devices, and these computer programs provide efficient uplink power control of the terminal device.

Advantageously these methods, these radio access network nodes, these terminal devices, and these computer programs enable the terminal device to, for a short time, increase its momentary transmission power above the applied averaged power limit (of e.g. 23 dBm), to allocate more power to the NR connection in case the power is split between LTE and NR for uplink transmission, thereby enhancing the total throughput provided by the terminal device, while staying compliant with average power limits and RF exposure limits.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
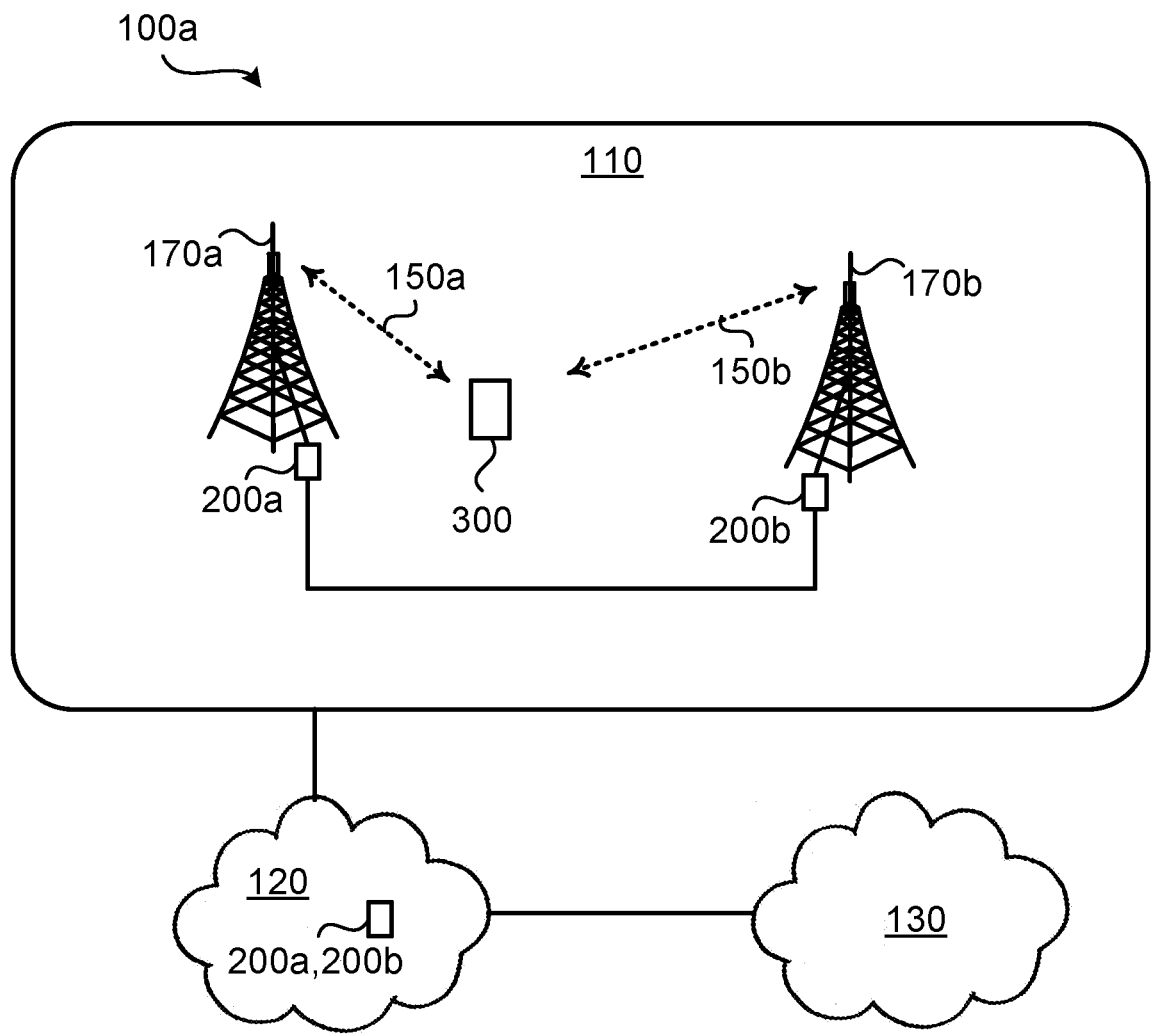
FIGS. 1 and 2 are schematic diagrams illustrating communication networks according to embodiments.

FIG. 1 is a schematic diagram illustrating a communication network bow where embodiments presented herein can be applied. The communication network bow could be a third generation (3G) telecommunications network, a fourth generation (4G) telecommunications network, or a fifth (5G) telecommunications network, or any combination thereof, and support any 3GPP telecommunications standard, where applicable.

The communications network 100 comprises radio access network nodes 200a, 200b of respective sites 170a, 170b that provide network access to at least one terminal device 300 in a radio access network 110, thus enabling the terminal device 300 to communicate over a wireless link 150a, 150b. The radio access network 110 is operatively connected to a core network 120. The core network 120 is in turn operatively connected to a service network 130, such as the Internet. The terminal device 300 is thereby enabled to, via the site 140, 140a, mob, access services of, and exchange data with, the service network 130.

Examples of sites 170a, 170b are radio base stations, transmission and reception points, base transceiver stations, Node Bs (NBs), evolved Node Bs (eNBs), gNBs, access points, and access nodes, and backhaul nodes. Examples of terminal devices 300 are wireless devices, mobile stations, mobile phones, handsets, wireless local loop phones, user equipment (UE), smartphones, laptop computers, tablet computers, network equipped sensors, network equipped vehicles, and so-called Internet of Things devices.

The radio access network nodes 200a, 200b might comprise, be collocated with, integrated with, or be in operational communications with, the sites 170a, 170b. At least one of the sites 170a, 170b might be configured for dual connectivity and/or carrier aggregation.

As noted above, an object of embodiments herein is to provide efficient control of terminal devices 300 that perform radio transmission in the uplink.

Dual connectivity and carrier aggregation can be combined. For example, when more than one RAT, such as LTE and NR, are combined at a site 170a, 170b, dual connectivity can be used such that one leg of the dual connectivity is used for LTE whilst another leg is used for NR. In such a situation carrier aggregation groups of terminal devices on one RAT might be used on each of the legs of the dual connectivity. Here the term "leg" refers to one specific connectivity between the network node and the terminal device.

In some aspects, dynamic power sharing between LTE and NR might be used in a situation where $\hat{P}_{LTE}+\hat{P}_{NR}>\hat{P}_{Total}^{EN-DC}$ occurs. Here, $\hat{P}$ is measured as linear power. $\hat{P}_{LTE}$ is the evaluated uplink transmission power needed on the LTE leg, $\hat{P}_{NR}$ is the evaluated uplink transmission power needed on the NR leg, and $\hat{P}_{Total}^{EN-DC}$ is the maximum uplink transmission power the terminal device 300 is allowed to use in total for both legs due to power regulation requirements, including considerations of e.g. RF exposure regulations. Typically, for dynamic power sharing to be strictly applicable, an assumption is that the same frequency band and antenna system is used. Otherwise, the different antennas at the terminal device 300 might introduce an inaccuracy.

Whenever the terminal device 300 is scheduled within a time frame that is overlapping between LTE and NR, the terminal device 300 will allocate the uplink transmission power according to the following scheme (as specified in 3GPP technical specification 38.213, "NR; Physical layer procedures for control", Version 15.5.0, section 7.6.1):

First, $\hat{P}_{LTE}$ is determined for allocation of physical resource blocks (PRBs) on the LTE leg whilst ignoring the NR uplink.

Second, $\hat{P}_{NR}$ is determined for allocation of physical resource blocks on the NR leg, considering allocation of physical resource blocks for both LTE and NR, whilst ignoring the total EN-DC power ($\hat{P}_{Total}^{EN-DC}$), where EN-DC is short for E-UTRA (Evolved Universal Terrestrial Radio Access)-NR Dual Connectivity.

Third, in case $\hat{P}_{LTE}+\hat{P}_{NR}>\hat{P}_{Total}^{EN-DC}$ the terminal device 300 will reduce the already calculated uplink transmission power on the NR leg to a lower value that fulfills the total maximum uplink transmission power requirement. This is achieved by performing power scaling. The amount of power scaling the terminal device 300 at least must support is specified with the xScale RRC parameter (as specified in 3GPP technical specification 38.331 "NR; Radio Resource Control (RRC); Protocol specification", Version 15.5.1, section 6.3.2 (sub heading PhysicalCellGroupConfig)). The default value of this xScale parameter is 6 dB. If power scaling is needed that exceeds the configured xScale parameter, the terminal device 300 is permitted to drop its current uplink transmission.

According to this scheme for dynamic power sharing, there is thus a risk that an uplink transmission is dropped altogether. This dropping of the uplink transmission is an issue for uplink transmission of user data, because it reduces the peak maximum uplink data rate for the terminal device 300 and it causes a loss of uplink resources (such as physical resource blocks) in the NR leg, which uplink resources could have been used for other terminal devices. This scheme might also cause issues with downlink traffic if the corresponding feedback control signals (such as acknowledgements (ACKs) and negative acknowledgements (NACKs) for Hybrid automatic repeat request (hybrid ARQ or HARQ)) are dropped, because this implies that the serving radio access network node 200a, 200b will not be informed whether the terminal device 300 has received a downlink transmission. As a consequence, this will lead to unnecessary retransmissions in the downlink, which might reduce the peak downlink data rate which will waste resources over the air interface (such as the LTE air interface or the NR air interface).

The embodiments disclosed herein therefore relate to mechanisms for uplink power control of a terminal device 300. In order to obtain such mechanisms there is provided a radio access network node 200a, 200b, a method performed by the radio access network node 200a, 200b, a computer program product comprising code, for example in the form of a computer program, that when run on processing circuitry of the radio access network node 200a, 200b, causes the radio access network node 200a, 200b to perform the method. In order to obtain such mechanisms there is further provided a terminal device 300, a method performed by the terminal device 300, and a computer program product comprising code, for example in the form of a computer program, that when run on processing circuitry of the terminal device 300, causes the terminal device 300 to perform the method.

The limits in the ICNIRP guidelines and other RF exposure standards and regulations are commonly related to a specified averaging time T. After a transformation to the power domain, this means that the momentary transmitted power might be higher than the maximum average value, obtained to meet the RF exposure regulations, during shorter time intervals than T, as long as the determined time-averaged transmitted power over any time interval T is below the maximum average power value if this would be needed to enhance the communication performance. To ensure that the average power is maintained below any maximum value, automatic control functionality is provided that ensures that the average uplink power is always below the allowed total average uplink value.

Parallel reference will now be made to FIGS. 2 and 4.

Figure 2:
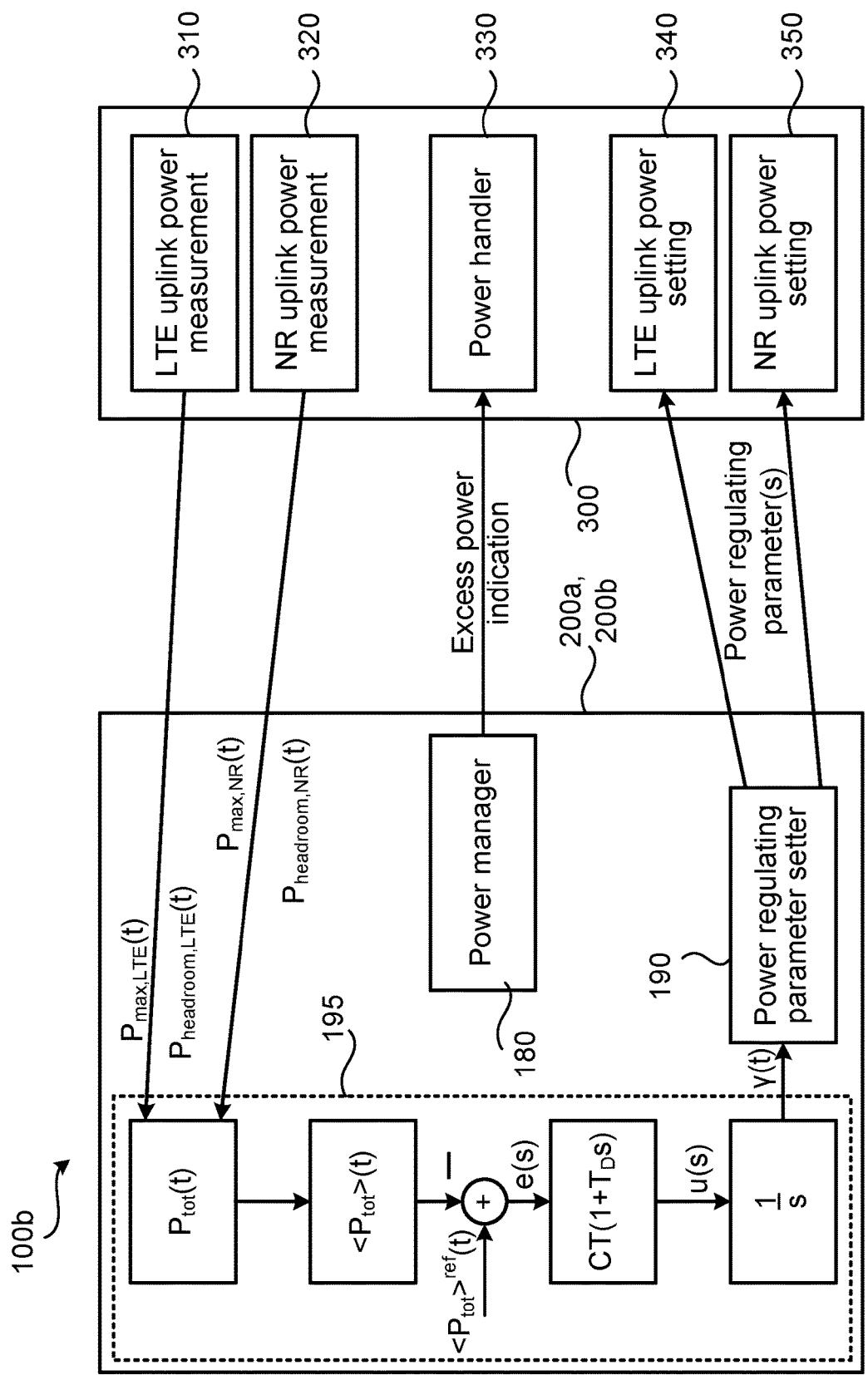

FIG. 2 is a schematic diagram illustrating a communication network mob where embodiments presented herein can be applied. The communication network mob shows uplink power control of a terminal device 300 as performed in a controller 195 of at least one radio access network node 200a, 200b. In the block diagram, functions and signals are shown being a function of time t or the Laplace transform frequency variable s, whichever is convenient.

Figure 4:
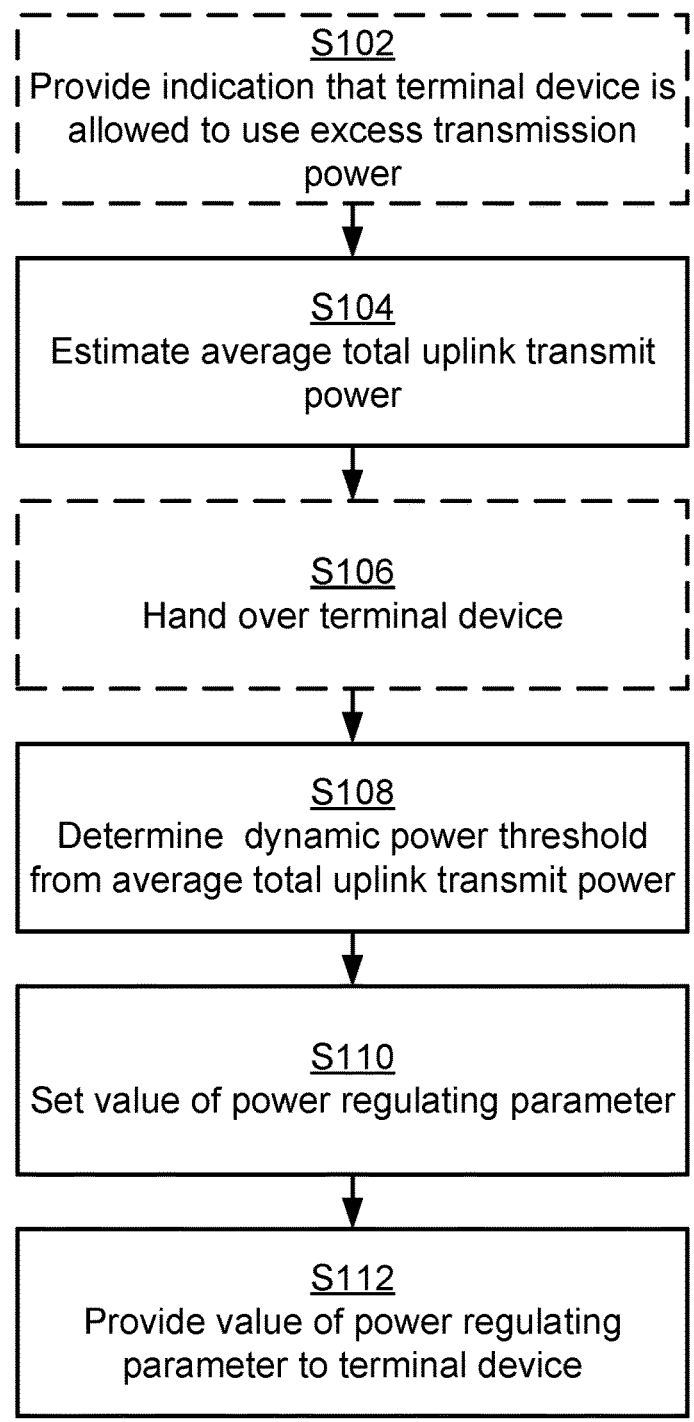
FIGS. 4 and 5 are flowcharts of methods according to embodiments.

FIG. 4 illustrates a method for uplink power control of a terminal device 300 as performed by at least one radio access network node 200a, 200b according to embodiments. The at least one radio access network node 200a, 200b represents the network 110, 120.

S104: Average total uplink transmit power $\langle P_{tot} \rangle (t)$ for the terminal device 300 is estimated.

Examples of how the total uplink transmit power $\langle P_{tot} \rangle (t)$ might be estimated will be disclosed below.

S108: A dynamic power threshold from the average total uplink transmit power is determined according to a back-off power control loop. In the back-off power control loop, a setpoint value $\langle P_{tot} \rangle^{ref}$ of total average transmission power is compared with a value of the estimated average total uplink transmit power $\langle P_{tot} \rangle (t)$.

Examples of how the dynamic power threshold might be determined will be disclosed below.

S110: A value of a power regulating parameter is set as a function of the dynamic power threshold.

Examples of how the value of the power regulating parameter might be set will be disclosed below. In some aspects the value of the power regulating parameter is set by a power regulating parameter setter 190.

S112: The value of the power regulating parameter is provided to the terminal device 300 for uplink power control of the terminal device 300.

Examples of how the value of the power regulating parameter might be provided to the terminal device 300 will be disclosed below. In some aspects, the value of the power regulating parameter is provided to an LTE uplink power setting unit 340 and an NR uplink power setting unit 340 in the terminal device 300.

Embodiments relating to further details of uplink power control of a terminal device 300 as performed by at least one radio access network node 200a, 200b will now be disclosed.

In some aspects it is assumed that the terminal device 300 is enabled to, for shorter periods of time than the averaging time T, transmit in the uplink with higher total transmission power for LTE and/or NR than the maximum transmit power value determined for compliance with a regulatory RF exposure limit (e.g. 23 dBm). In particular, to produce a gain for the above scheme for dynamic power sharing, the momentary uplink transmission power on the NR leg is allowed to temporarily use an increased total transmission power budget a few dBs over the determined maximum transmit power value, for example temporarily using say 28 dBm. However, in order for this to be permittable, the average total uplink transmit power, averaged over a time interval with duration T needs to be maintained below the maximum transmit power value. This can, in principle, be handled in the terminal device 300 or in the network 110, 120. In particular, according to an embodiment, the at least one radio access network node 200a, 200b is configured to perform (optional) S102:

S102: An indication is provided to the terminal device 300 that the terminal device 300, when its uplink power is controlled by the network 110, 120, is allowed to use an excess transmission power. The excess transmission power is higher than a default maximum transmission power. The value of the power regulating parameter is then set also as a function of the excess transmission power.

The indication in S102 might comprise an "on command", "off command", or an explicit value of the excess transmission power.

When the terminal device 300 registers to the network 110, 120 or to a new cell (depending on the implementation), the power control manager 180, or equivalent functionality, might thus sends an indication, as in S102, to the terminal device 300, indicating whether an increased maximum transmission power (as defined by the excess transmission power) is allowed to be used. The terminal 300 responds by setting its maximum transmission power depending on the indication.

Further, the network 110, 120 might be made aware that the terminal device 300 has been enabled to use the excess transmission power. In some aspects this is implemented by communication between the power control manager 180 at the network side and the power handler 330 at the terminal device 300. In some examples the power control manager 180 receives an indication from the terminal device 300 that the uplink power is controlled according to the value of the power regulating parameter as provided by the network 110, 120. The reception may be the result of continuous polling run by the power control manager 180, or an activation/deactivation event of the back-off power control loop as run in the network 110, 120.

In some aspects the use of increased maximum transmission power is preconfigured.

Aspects of how to estimate the total uplink transmit power $\langle P_{tot} \rangle (t)$ will now be disclosed.

In this respect, according to an embodiment, each value of momentary total uplink transmit power is expressed as a difference between a maximum transmit power value for uplink transmission and a power headroom value for uplink transmission for the terminal device 300. The power headroom value might be obtained in a measurement report from the terminal device 300. Periodic measurement reporting of uplink maximum transmit power and power headroom might therefore be setup from the terminal device 300, for the LTE leg and the NR leg. This information allows for computation of the momentary total uplink transmit power $P_{tot}(t)$ as:

$$P_{tot}(t)=P_{max,LTE}(t)-P_{headroom,LTE}(t)+P_{max,NR}(t)-P_{headroom,NR}(t).$$

Here, $P_{max,LTE}(t)$ denotes the maximum transmit power applied for uplink LTE transmission by the terminal device 300 at time t, $P_{headroom,LTE}(t)$ denotes the power headroom for uplink LTE transmission at time t, $P_{max,NR}(t)$ denotes the maximum transmit power applied for uplink NR transmission by the terminal device 300 at time t, and $P_{headroom,NR}(t)$ denotes the power headroom for uplink NR transmission at time t. In some aspects, these values are provided from an LTE uplink power measurement unit 310 and an NR uplink power measurement unit 320 in the terminal device 300. According to an embodiment, the uplink power control is performed for a first RAT and a second RAT, and there are separate values of momentary total uplink transmit power $P_{tot}(t)$ for each RAT.

The average total uplink transmit power $\langle P_{tot}\rangle(t)$ can then be determined over a sliding window of duration T with N samples in it as:

$$\langle P_{tot}\rangle(t) = \frac{1}{N}\sum_{i=1}^{N} P_{tot}(t_i),$$

where $t_i$ is the time of the i:th momentary power sample in the averaging window. Thus, according to an embodiment values of momentary total uplink transmit power reside in a sliding window having a pre-specified duration.

In some aspects the value of the power regulating parameter is provided to the terminal device 300 from the same radio access network node as the average total uplink transmit power is estimated by. In particular, as in FIG. 1, according to an embodiment, the network 110, 120 comprises a first radio access network node 200a, the average total uplink transmit power for the terminal device 30 is estimated by a controller of the first radio access network node 200a, and the value of the power regulating parameter is provided to the terminal device 300 from the first radio access network node 200a.

In other aspects a handover of the terminal device 300 from the first radio access network node 200a to the second radio access network node 200b is made between estimating the average total uplink transmit power and providing the power regulating parameter to the terminal device 300. In particular, as in FIG. 1, according to an embodiment, the network 110, 120 comprises a first radio access network node 200a and a second radio access node, and the method further comprises:

S106: The terminal device 300 is handed over from the first radio access network node 200a to the second radio access network node 200b after the average total uplink transmit power for the terminal device 300 has been estimated.

According to this embodiment, the average total uplink transmit power for the terminal device 300 is estimated by a controller of the first radio access network node 200a, and the value of the power regulating parameter is provided to the terminal device 300 from the second radio access network node 200b upon the terminal device 300 having been handed over from the first radio access network node 200a to the second radio access network node 200b.

To ensure that the uplink power usage for the terminal device 300 is not lost when the terminal device 300 is handed over, certain information about the terminal device 300 is provided from the first first radio access network node 200a to the first radio access network node 200b in conjunction with the handover. There could be different examples of such information. In particular, according to an embodiment, the values of momentary total uplink transmit power $P_{tot}(t)$ in the sliding window for the terminal device 300 is provided from the first radio access network node 200a to the second radio access network node 200b in a private message container in conjunction with handing over the terminal device 300. That is, in some examples the accumulated uplink power usage, as defined by the the values of momentary total uplink transmit power $P_{tot}(t)$ in the sliding window, is transferred to the second radio access network node 200b.

According to an embodiment, the determined dynamic power threshold is provided from the first radio access network node 200a to the second radio access network node 200b.

Values of further parameters used in the back-off power control loop might also be transferred to the second radio access network node 200b from the first radio access network node 200b. For example, the entire state of the back-off power control loop as specified in this disclosure, or the accumulated amount of uplink transmission power for which the terminal device 300 has gone above the maximum transmit power value ($\hat{P}_{Total}^{EN-DC}$).

There could be different ways in which the values of the parameters are provided from the first radio access network node 200a to the second radio access network node 200b. In particular, according to an embodiment, the value of average total uplink transmit power for the terminal device 300 is provided from the first radio access network node 200a to the second radio access network node 200b in a private message container. In particular, according to an embodiment, the determined dynamic power threshold is provided from the first radio access network node 200a to the second radio access network node 200b in the private message container. Also values of further parameters used in the back-off power control loop might be provided in the private message container. The private message container might be provided over the X2 interface.

Further, whenever the terminal device 300 leaves radio resource control (RRC)RRC connected mode and enters RRC idle mode, the values of the parameters used in the back-off power control loop might be stored in the network 110, 120, and whenever the terminal device 300 enters RRC connected mode, the thus stored values of the parameters used in the back-off power control loop might be fetched as needed by the radio access network node 200a, 200b serving the terminal device 300.

Figure 3:
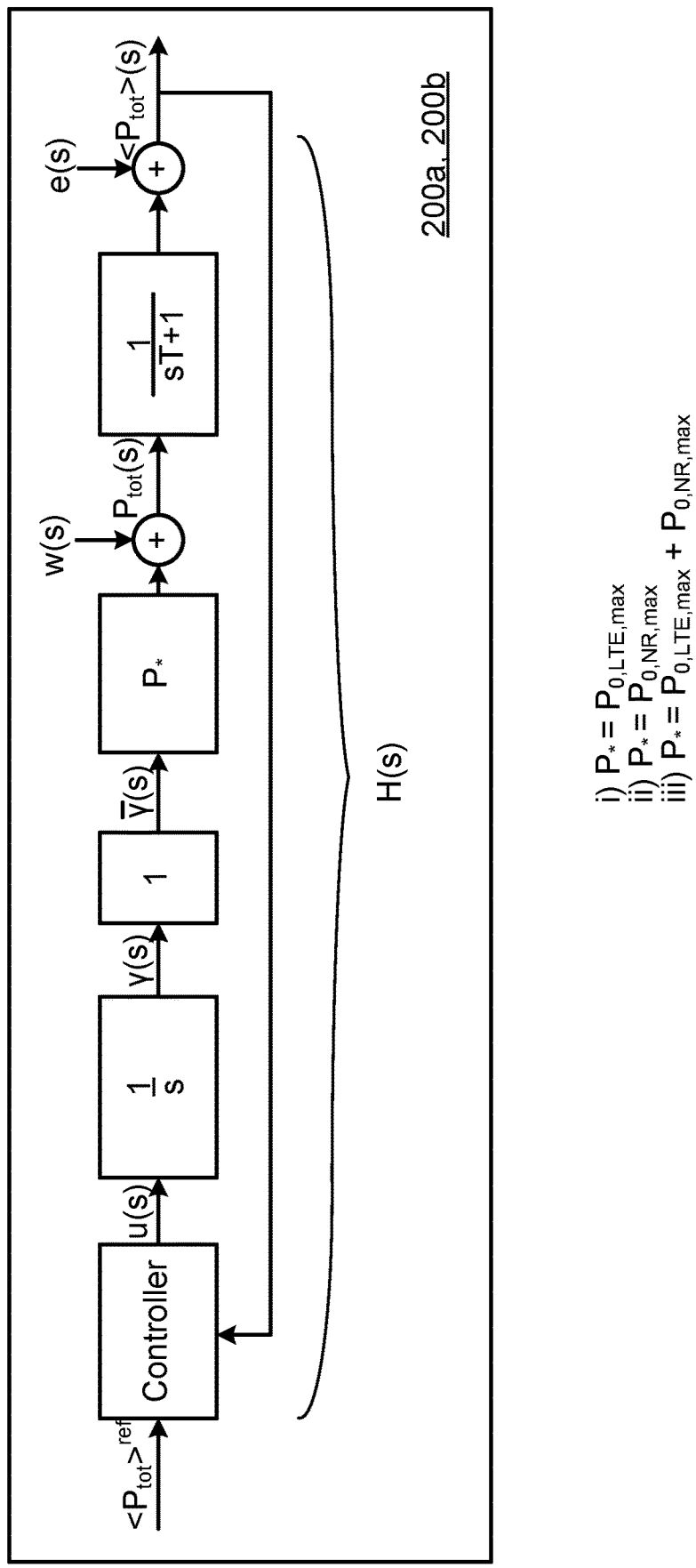
FIG. 3 is a block diagram of a controller according to an embodiment.

Aspects of how to determine the dynamic power threshold will now be disclosed with reference to the block diagram of FIG. 3. FIG. 3 is a block diagram where feedback control has been enabled by a feedback control loop, in this disclosure denoted a back-off power control loop. In FIG. 3, $\rangle P_{tot}\rangle^{ref}$ denotes the setpoint for the averaged power (typically slightly less than the computed threshold value for the averaged power), 1/s denotes the actuator dynamics with lower and upper limits inactive, γ(t) denotes the scheduler limitation after lower and upper limitation (inactive in FIG.

3), $P_*$ denotes the maximal momentary total power of the terminal device 300. According to a first alternative, $P_*$ denotes the maximal total power for LTE uplink transmission, that is: $P_*=P_{0,LTE,max}$. According to a second alternative, $P_*$ denotes the maximal total power for NR uplink transmission, that is: $P_*=P_{0,NR,max}$. According to a third alternative, $P_*$ denotes the sum of the maximal total power for LTE and NR uplink transmission, that is: $P_*=P_{0,LTE,max}+P_{0,NR,max}$. Further, w(s) denotes a disturbance representing predicted power errors, 1/(sT+1) represents an autoregressive simplified model of the averaging, $\langle P_{tot}\rangle$ (s) denotes the averaged total power, and e(s) denotes a measurement disturbance. All quantities are in FIG. 3 expressed in the Laplace transform domain, which is allowed since the feedback control mechanism design is performed with constraints inactive. Neither w(s) nor e (s) are a part of the herein disclosed inventive concept, but are only shown to provide a model for controller design.

In some aspects the controller block is given by:

$$u(s)=CT(1+T_D s)(\langle P_{tot}\rangle^{ref}-\langle P_{tot}\rangle(s)).$$

Here, u(s) is the control signal. A controller implementing this controller block is of proportional-derivative (PD) type. C denotes the proportional gain, and $T_D$ the differentiation time.

The poles of the closed loop system of FIG. 3 are given by the following second order equation:

$$s^2+(1/T+P_*CT_D)s+P_*C=0.$$

These poles govern the closed loop dynamics of the feedback control mechanism, the actuator mechanism, and the averaged power. In order to determine the proportional gain and the differentiation time, a closed loop polynomial with desired poles in $-\alpha_1$ and $-\alpha_2$ is specified as:

$$s^2+(\alpha_1+\alpha_2)s+\alpha_1\alpha_2=0.$$

An identification of coefficients and solution of the resulting system of equations reveal that the proportional gain and differentiation time shall be selected as:

$$C = \frac{\alpha_1\alpha_2}{P_*}, \text{ and}$$

$$T_D = \frac{\alpha_1+\alpha_2-\frac{1}{T}}{\alpha_1\alpha_2}.$$

A reason for this choice is that a system with two negative real poles can be expected to be well damped, which is a result of a significant differentiation action.

To implement the feedback control mechanism, $\langle P_{tot}\rangle^{ref}$, $\langle P_{tot}\rangle$ (t) and $\rangle \dot{P}_{tot}\rangle$ (t) are needed. The first two quantities can be obtained by configuration and averaging of measured spectral density's by C, while the second quantity needs to be estimated. This can e.g. be achieved by autoregressive filtering of $\langle P_{tot}\rangle$ (t) with the filter:

$$\langle \dot{P}_{tot}\rangle(s) = \frac{\alpha s}{s+\alpha}\langle P_{tot}\rangle(s),$$

where $\alpha$ is a filter parameter.

In order to further emphasize the back-off power control performance it could be advisable to only allow differential control action that reduces a dynamic power threshold $\gamma(t)$, meaning that only negative contributions from the second term of the feedback mechanism should be allowed. This means that in the time domain, the following restriction to the derivative $\langle \dot{P}_{tot}\rangle$ (t) might be applied:

$$u(t)=CT(\langle P_{tot}\rangle^{ref}-\langle P_{tot}\rangle(t))-CTT_D$$
$$\max(0,\langle \dot{P}_{tot}\rangle(t)).$$

It might occur that the feedback control mechanism is not fast enough to prevent a small overshoot of the threshold value. To prevent this from occurring, a hard back-off might be superimposed over the herein disclosed feedback control mechanism. In some aspects this hard back-off operates by setting the dynamic power threshold $\gamma(t)$ to its minimum value $\gamma_{low}$ whenever the following holds:

$$\langle P_{tot}\rangle(t) > \text{margin} \cdot P_{max,regulatory}$$

where margin is a value slightly below 1 and where $P_{max,regulatory}$ is the maximum average uplink power level determined to meet regulatory requirements. Another more advanced look ahead mechanism could also be used. Further aspects of the dynamic power threshold $\gamma(t)$ will be disclosed below.

There could be different examples of the power regulating parameters. According to an embodiment, the power regulating parameter pertains to scaling of the total uplink transmission power.

According to an embodiment, the uplink power control is performed for a first RAT and a second RAT, and there is one maximum transmit power value and one power headroom value per RAT but one common value of momentary total uplink transmit power for both RATs. In some examples, one common value of the dynamic power threshold $\gamma(t)$ is determined for both RATs, but a separate value of the power regulating parameter is determined for each RAT. There could be different ways to combine the dynamic power threshold $\gamma(t)$ with the maximum of $P_{0,LTE}$ and $P_{0,NR}$, denoted $P_{0,LTE,max}$ and $P_{0,NR,max}$ in order to close the back-off power control loop. $P_{0,LTE}$ and $P_{0,NR}$ represent desired transmit power values of the terminal device 300 and are set so that physical resource blocks as transmitted by the terminal device 300 are received by the network 110, 120 with guaranteed powers.

According to a first example, reduction of average uplink power on the LTE leg is achieved by setting $P_{0,LTE}(t)=\gamma(t)P_{0,LTE,max}$.

According to a second example, reduction of average uplink power on the NR leg is achieved by setting $P_{0,NR}(t)=\gamma(t)P_{0,NR,max}$.

According to a third example, reduction of average uplink power on both the LTE leg and the NR leg is achieved by setting $P_{0,LTE}(t)=\gamma(t)P_{0,LTE,max}$ and $P_{0,NR}(t)=\gamma(t)P_{0,NR,max}$.

According to a further example, a respective value of the power regulating parameter (such as $\gamma_{LTE}(t)$ and $\gamma_{NR}(t)$) is set for each RAT, and these values of the power regulating parameter are weighted such that the excess transmission power is not exceeded.

There are different ways to achieve the reduction of the average uplink power as specified above, and thus different properties to which the power regulating parameter pertains. According to a first example, the scheduler reduces the number of physical resource blocks the terminal device 300 is allowed to use. That is, according to an embodiment, the power regulating parameter pertains to which fraction of a default amount of physical resource blocks the terminal device 300 is to use during uplink transmission. According to a second example, the terminal device 300 is configured with a lower value of the maximum uplink transmit power, as set with the P-UE-FR1 3GPP parameter (defining the maximum uplink power for which the terminal device 300 normally is allows to use). That is, according to an embodiment, the power regulating parameter pertains to a specific value of the maximum uplink power the terminal device 300 is allowed to use during uplink transmission.

As disclosed above, in some aspects the control is of proportional-derivative (PD) type. That is, according to an embodiment the back-off power control loop is of PD type. As also disclosed above, in some aspects the control is of derivative (D) type. That is, according to an embodiment the back-off power control loop is of D type. Thus, in some aspects only differential control is allowed.

In order to get a smooth behavior of the limiting threshold applied to $P_{0,LTE}(t)$ and $P_{0,NR}(t)$, in order to limit the averaged output power, it might be rate controlled. That means that the control signal commands adjustments to the limiter, making it increase or decrease. In some aspects, the dynamics of the actuator mechanism is determined to be:

$$\dot{\gamma}(t)=u(t),$$

where γ(t) is the dynamic fractional power threshold, where u(t) is the time domain control signal of the control signal disclosed above, and t denotes continuous time. The resource threshold just expresses a fractional limitation on $P_{0,LTE}(t)$ and $P_{0,NR}(t)$ not to use more than a fraction γ(t) of their maximum.

The maximum value of γ(t) is 1.0 since it is to express a fraction. There might also be a need to limit its lower value, to avoid that the dynamic feedback control mechanism reduces it to an unphysical value below 0.0. The following dynamic threshold limitation might therefore be applied at each time the back-off power control loop is executed:

$$\gamma_{now} \leq \gamma(t) \leq 1.0.$$

One purpose of the disclosed actuator and feedback control mechanisms is to control the averaged output power of the terminal device 300, to be below the maximum uplink transmit power value. When this is not needed, these mechanisms might be disabled, leaving the terminal device 300 to operate without any limitation. Hence, in some aspects there is disclosed a supervision mechanism for enabling and disabling the proposed actuator and feedback control mechanisms. Therefore, according to an example: 1) Enable the back-off power control loop when $\langle P_{tot}\rangle(t)>\delta_1 P_*$, and set γ(t)=1, and 2) Disable the back-off power control loop when $\langle P_{tot}\rangle(t)<\delta_2 P_*$. In some aspects the values fulfil: $\delta_2 P_* \leq \langle P_{tot}\rangle^{ref} \leq \delta_1 P_*$.

Figure 5:
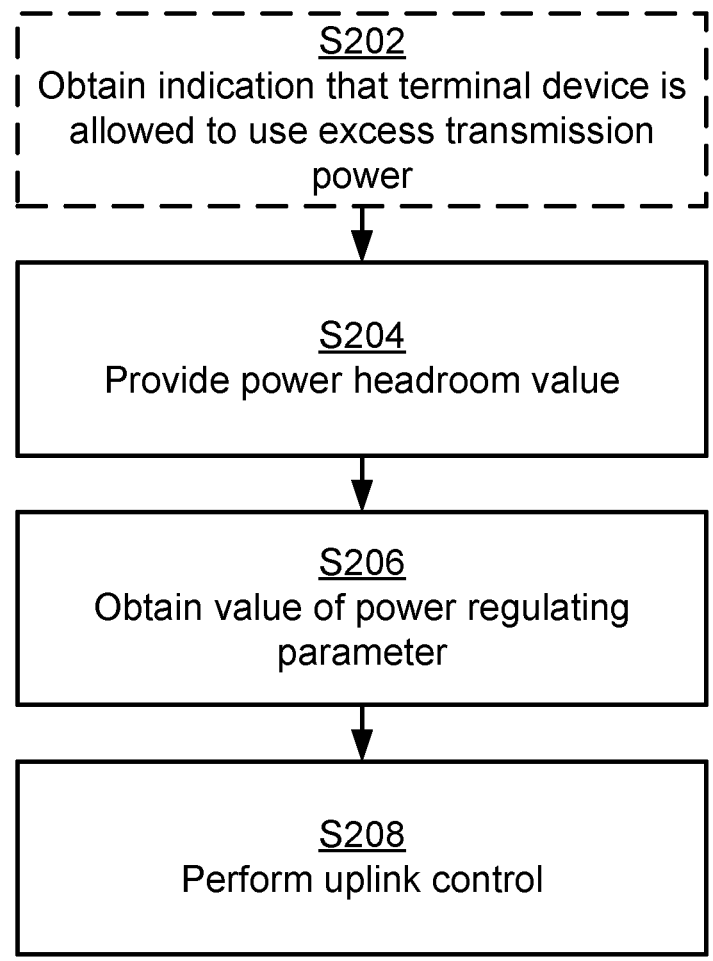

Reference is now made to FIG. 5 illustrating a method for uplink power control of a terminal device 300 as performed by the terminal device 300 according to an embodiment.

S204: The terminal device 300 provides, to the network 110, 120 serving the terminal device 300, a power headroom value for uplink transmission for the terminal device 300. The power headroom value represents a value of momentary uplink transmit power of the terminal device 300.

In some examples the power headroom value is provided to the first radio access network node 200*a*.

S206: The terminal device 300 obtains, from the network 110, 120, a value of a power regulating parameter.

In some examples the value of the power regulating parameter is obtained from the first radio access network node 200*a* or from the second radio access network node 200*b*, depending on whether the terminal device 300 was handed over from the first radio access network node 200*a* to the second radio access network node 200*b* after having provided the power headroom value but before obtaining the value of the power regulating parameter.

S208: The terminal device 300 performs uplink power control of the terminal device 300 according to the power regulating parameter whereby total average transmission power of the terminal device 300 is limited in accordance with the value of the power regulating parameter.

Embodiments relating to further details of uplink power control of a terminal device 300 as performed by the terminal device 300 will now be disclosed.

As disclosed above, an indication is provided to the terminal device 300 that the terminal device 300, when its uplink power is controlled by the network 110, 120, is allowed to use an excess transmission power. Hence, according to an embodiment, the terminal device 300 is configured to perform (optional) S202:

S202: The terminal device 300 obtains an indication from the network 110, 120 that the terminal device 300, when its uplink power is controlled by the network 110, 120, is allowed to use an excess transmission power being higher than a default maximum transmission power. The uplink power control in S208 is then performed as a function of the excess transmission power.

Figure 6:
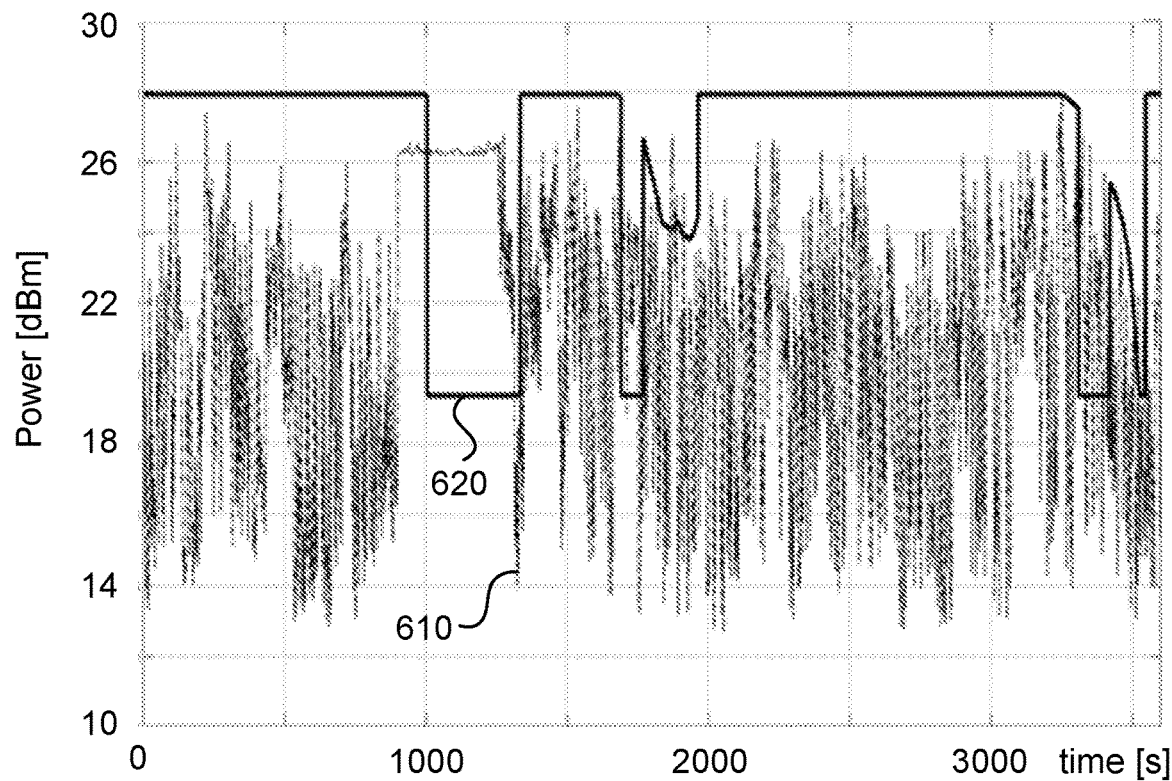
FIGS. 6 and 7 show simulation results according to embodiments.
Figure 7:
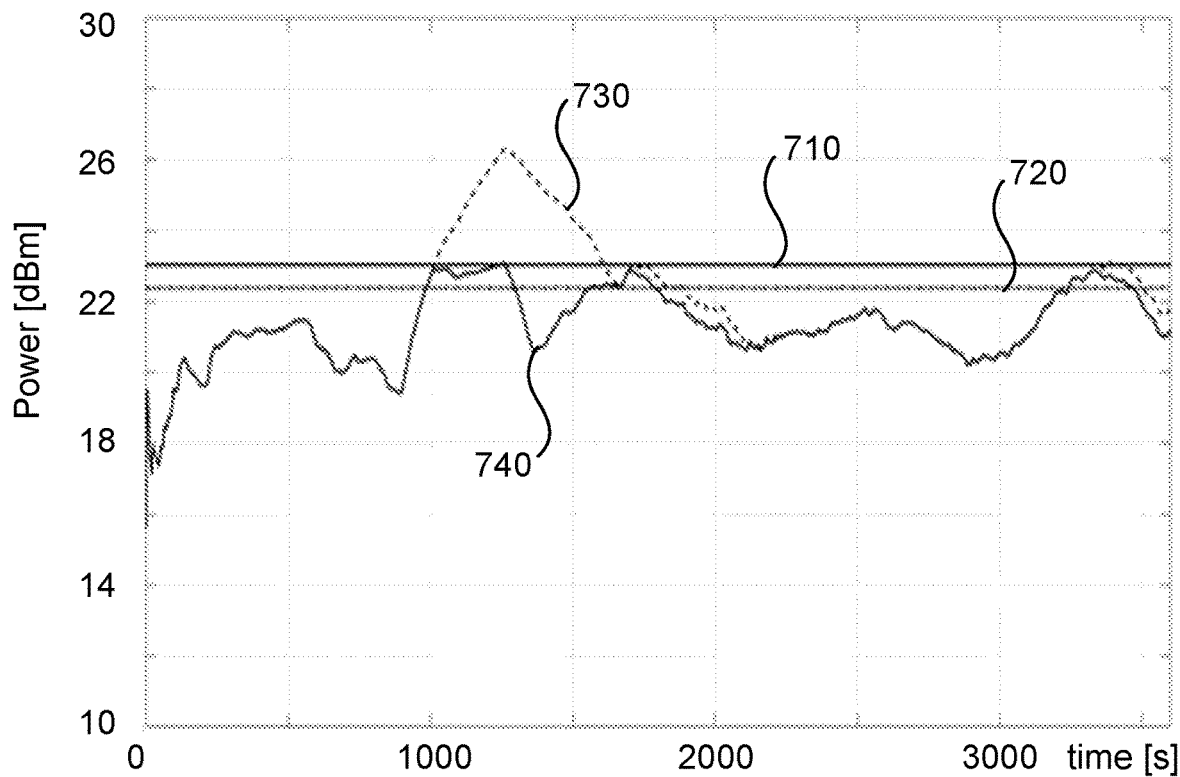

Simulation results of the herein disclosed uplink power control of the terminal device 300 will now be presented with reference to FIG. 6 and FIG. 7. The simulation results represent an implementation with an averaging window of 6 minutes using a sampling period of 0.5 s. The terminal device 300 was assumed to be capable of transmitting with a maximum uplink power of 28 dBm, and the determined average maximum uplink power was assumed to be 23 dBm. The NR uplink power boost occurs approximately at time 850 seconds lasting for about 300 seconds, resulting in an increased sustained total uplink power slightly above 26 dBm during this period. FIG. 6 shows uncontrolled momentary power (610) and dynamic threshold (620) for an averaging time of 6 minutes. FIG. 7 shows computed average uplink power limit (710), reference uplink average power for the back-off power controller (720), uncontrolled uplink average power (730), and controlled uplink average power (740). Accordingly, the controller keeps the average uplink power below 23 dBm, as required.

When the herein disclosed control is implemented in a computer, discretization can be used e.g. with the Euler approximation or with the so called Tustin approximation. Such discretization techniques are as such well known in the art.

Figure 8:
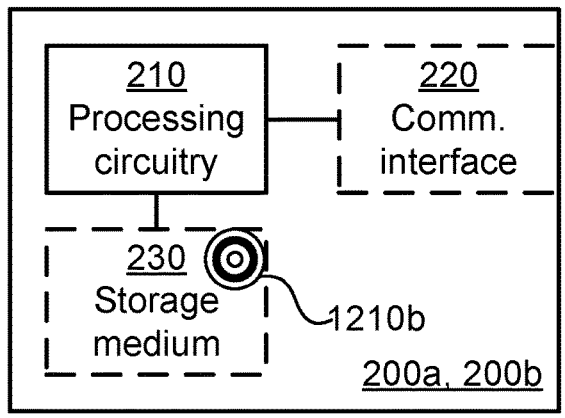
FIG. 8 is a schematic diagram showing functional units of a radio access network node according to an embodiment.

FIG. 8 schematically illustrates, in terms of a number of functional units, the components of a radio access network node 200*a*, 200*b* according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210*a* (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio access network node 200*a*, 200*b* to perform a set of operations, or steps, as disclosed above. For example, the storage medium 230 may store the set of operations, and the processing circuitry 210 may be configured to retrieve the set of operations from the storage medium 230 to cause the radio access network node 200*a*, 200*b* to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The radio access network node 200a, 200b may further comprise a communications interface 220 for communications with other entities, components, functions, nodes, and devices of the communications network 100. As such the communications interface 220 may comprise one or more transmitters and receivers, comprising analogue and digital components.

The processing circuitry 210 controls the general operation of the radio access network node 200a, 200b e.g. by sending data and control signals to the communications interface 220 and the storage medium 230, by receiving data and reports from the communications interface 220, and by retrieving data and instructions from the storage medium 230. Other components, as well as the related functionality, of the radio access network node 200a, 200b are omitted in order not to obscure the concepts presented herein.

Figure 9:
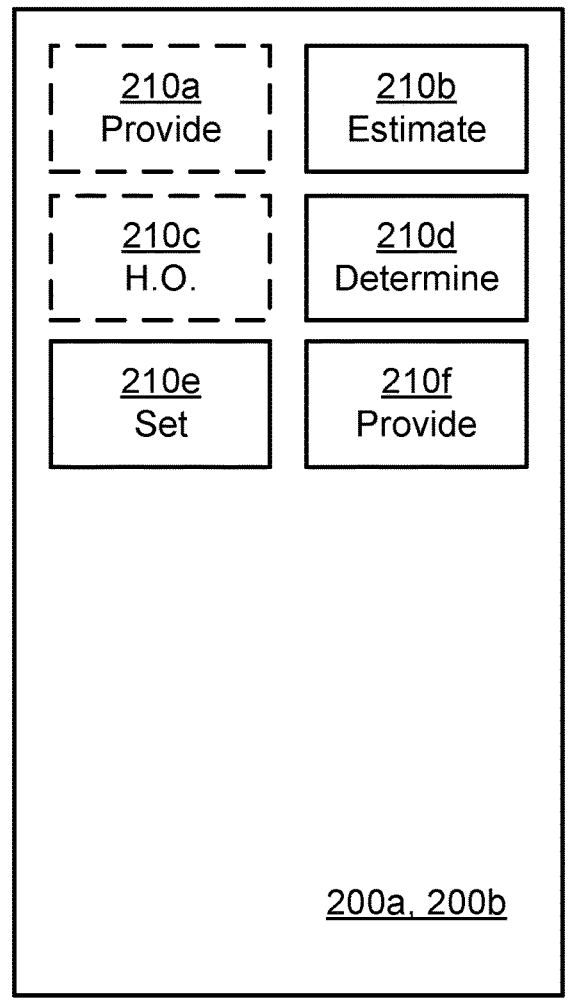
FIG. 9 is a schematic diagram showing functional modules of a radio access network node according to an embodiment.

FIG. 9 schematically illustrates, in terms of a number of functional modules, the components of a radio access network node 200a, 200b according to an embodiment. The radio access network node 200a, 200b of FIG. 9 comprises a number of functional modules; an estimate module 210b configured to perform step S104, a determine module 210d configured to perform step S108, a set module 210e configured to perform step S110, and a provide module 210f configured to perform step S112. The radio access network node 200a, 200b of FIG. 9 may further comprise a number of optional functional modules, such as any of a provide module 210a configured to perform step S102, and a handover (H. O.) module 210c configured to perform step S106. In general terms, each functional module 210a-210f may be implemented in hardware or in software. Preferably, one or more or all functional modules 210a-210f may be implemented by the processing circuitry 210, possibly in cooperation with the communications interface 220 and/or the storage medium 230.

The processing circuitry 210 may thus be arranged to from the storage medium 230 fetch instructions as provided by a functional module 210a-210f and to execute these instructions, thereby performing any steps of the radio access network node 200a, 200b as disclosed herein.

The radio access network node 200a, 200b may be provided as a standalone device or as a part of at least one further device. For example, the radio access network node 200a, 200b may be provided in a node of the radio access network 110 or in a node of the core network 120. Alternatively, functionality of the radio access network node 200a, 200b may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time. In this respect, at least part of the radio access network node 200a, 200b may reside in the radio access network, such as in the radio access network node, for cases when embodiments as disclosed herein are performed in real time.

Thus, a first portion of the instructions performed by the radio access network node 200a, 200b may be executed in a first device, and a second portion of the instructions performed by the radio access network node 200a, 200b may be executed in a second device; the herein disclosed embodiments are not limited to any particular number of devices on which the instructions performed by the radio access network node 200a, 200b may be executed. Hence, the methods according to the herein disclosed embodiments are suitable to be performed by a radio access network node 200a, 200b residing in a cloud computational environment. Therefore, although a single processing circuitry 210, 310 is illustrated in FIG. 8 the processing circuitry 210 may be distributed among a plurality of devices, or nodes. The same applies to the functional modules 210a-210f of FIG. 9 and the computer program 1220a of FIG. 12.

Figure 10:
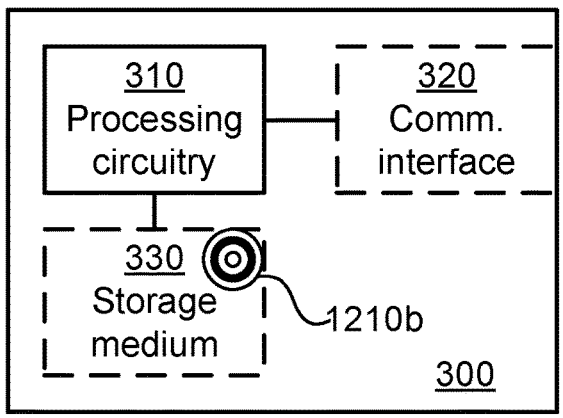
FIG. 10 is a schematic diagram showing functional units of a terminal device according to an embodiment.

FIG. 10 schematically illustrates, in terms of a number of functional units, the components of a terminal device 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1210b (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the terminal device 300 to perform a set of operations, or steps, as disclosed above. For example, the storage medium 330 may store the set of operations, and the processing circuitry 310 may be configured to retrieve the set of operations from the storage medium 330 to cause the terminal device 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The terminal device 300 may further comprise a communications interface 320 for communications with other entities, components, functions, nodes, and devices of the communications network 100. As such the communications interface 320 may comprise one or more transmitters and receivers, comprising analogue and digital components.

The processing circuitry 310 controls the general operation of the terminal device 300 e.g. by sending data and control signals to the communications interface 320 and the storage medium 330, by receiving data and reports from the communications interface 320, and by retrieving data and instructions from the storage medium 330. Other components, as well as the related functionality, of the terminal device 300 are omitted in order not to obscure the concepts presented herein.

Figure 11:
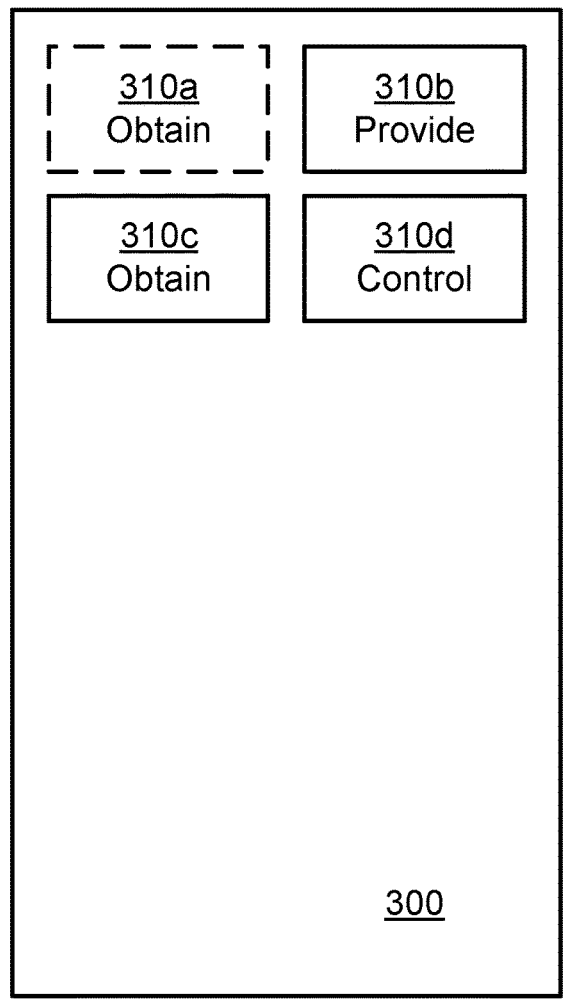
FIG. 11 is a schematic diagram showing functional modules of a terminal device according to an embodiment.

FIG. 11 schematically illustrates, in terms of a number of functional modules, the components of a terminal device 300 according to an embodiment. The terminal device 300 of FIG. 11 comprises a number of functional modules; a provide module 310b configured to perform step S204, an obtain module 310c configured to perform step S206, and a control module 310d configured to perform step S208. The terminal device 300 of FIG. 11 may further comprise a number of optional functional modules, such as an obtain module 310a configured to perform step S202. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the terminal device 300 as disclosed herein.

Examples of terminal devices 300 have been provided above.

Figure 12:
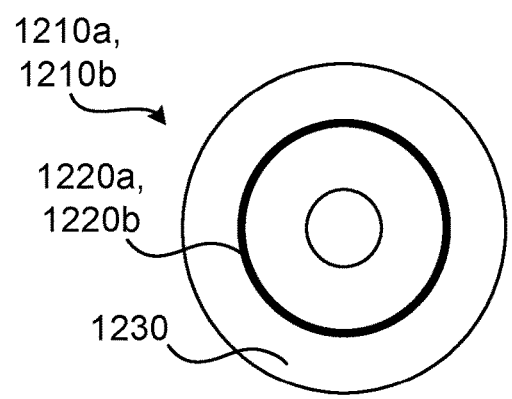
FIG. 12 shows one example of a computer program product comprising computer readable means according to an embodiment.

FIG. 12 shows one example of a computer program product 1210a, 1210b comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any steps of the radio access network node 200a, 200b as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any steps of the terminal device 300 as herein disclosed.

In the example of FIG. 12, the computer program product 1210a, 1210b is illustrated as an optical disc, such as a CD (compact disc) or a DVD (digital versatile disc) or a Blu-Ray disc. The computer program product 1210a, 1210b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b is here schematically shown as a track on the depicted optical disk, the computer program 1220a, 1220b can be stored in any way which is suitable for the computer program product 1210a, 1210b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for uplink average power control of a terminal device, the method being performed in a network serving the terminal device, wherein the network comprises a first radio access network node and a second radio access network node, the method comprising:
   estimating average total uplink transmit power for the terminal device;
   determining a dynamic power threshold from the average total uplink transmit power according to a back-off average power control loop, wherein, in the back-off average power control loop, a setpoint value of total average transmission power is compared with a value of the estimated average total uplink transmit power;
   setting a value of a power regulating parameter as a function of the dynamic power threshold;
   providing the value of the power regulating parameter to the terminal device for uplink power control of the terminal device; and
   handing over the terminal device from the first radio access network node to the second radio access network node after having estimated the average total uplink transmit power for the terminal device, wherein the average total uplink transmit power for the terminal device is estimated by a controller of the first radio access network node, and wherein the value of the power regulating parameter is provided to the terminal device from the second radio access network node upon the terminal device having been handed over from the first radio access network node to the second radio access network node.

2. The method according to claim 1, further comprising:
   providing an indication to the terminal device that the terminal device, when its uplink average power is controlled by the network, is allowed to use an excess transmission power being higher than a default maximum transmission power, and wherein the value of the power regulating parameter is set also as a function of the excess transmission power.

3. The method according to claim 2, wherein the power regulating parameter pertains to scaling of total uplink transmission power.

4. The method according to claim 1, wherein the average total uplink transmit power is estimated from values of momentary total uplink transmit power for the terminal device, the values of momentary total uplink transmit power residing in a sliding window having a pre-specified duration.

5. The method according to claim 4, wherein the values of momentary total uplink transmit power in the sliding window for the terminal device is provided from the first radio access network node to the second radio access network node in a private message container in conjunction with handing over the terminal device.

6. The method according to claim 4, wherein each value of momentary total uplink transmit power is expressed as a difference between a maximum transmit power value for uplink transmission and a power headroom value for uplink transmission for the terminal device.

7. The method according to claim 6, wherein the power headroom value is obtained in a measurement report from the terminal device.

8. The method according to claim 6, wherein the uplink average power control is performed for a first Radio Access Technology (RAT) and a second RAT, and wherein there is one maximum transmit power value and one power headroom value per RAT but one common value of momentary total uplink transmit power for both RATs.

9. The method according to claim 4, wherein the uplink average power control is performed for a first Radio Access Technology (RAT) and a second RAT, and wherein there are separate values of momentary total uplink transmit power for each RAT.

10. The method according to claim 1, wherein the value of average total uplink transmit power for the terminal device is provided from the first radio access network node to the second radio access network node in a private message container.

11. The method according to claim 1, wherein the determined dynamic power threshold is provided from the first radio access network node to the second radio access network node in a private message container.

12. The method according to claim 1, wherein the power regulating parameter pertains to which fraction of a default amount of physical resource blocks (PRBs) the terminal device is to use during uplink transmission.

13. The method according to claim 1, wherein the power regulating parameter pertains to a specific value of maximum uplink power the terminal device is allowed to use during uplink transmission.

14. The method according to claim 1, wherein the back-off average power control loop is of proportional-derivative (PD) type.

15. A first radio access network node for uplink average power control of a terminal device, the first radio access network node comprising:
    processing circuitry; and
    a memory comprising instructions which, when executed by the processing circuitry, cause the first radio access network node to:
        estimate average total uplink transmit power for the terminal device;
        determine a dynamic power threshold from the average total uplink transmit power according to a back-off average power control loop, wherein, in the back-off average power control loop, a setpoint value of total average transmission power is compared with a value of the estimated average total uplink transmit power; and
        hand over the terminal device from the first radio access network node to a second radio access network node after having estimated the average total uplink transmit power for the terminal device, in order for the second radio access network node to set a value of a power regulating parameter as function of the dynamic power threshold and to provide the value of the power regulating parameter to the terminal device for uplink power control of the terminal device, wherein the value of the power regulating parameter is provided to the terminal device from the second radio access network node upon the terminal device having been handed over from the first radio access network node to the second radio access network node.

16. A non-transitory machine-readable storage medium comprising computer code which, when run on processing circuitry of a first radio access network node, causes the first radio access network node to perform operations to control uplink average power of a terminal device, the operations comprising:
    estimating average total uplink transmit power for the terminal device;
    determining a dynamic power threshold from the average total uplink transmit power according to a back-off average power control loop, wherein, in the back-off average power control loop, a setpoint value of total average transmission power is compared with a value of the estimated average total uplink transmit power; and
    handing over the terminal device from the first radio access network node to a second radio access network node after having estimated the average total uplink transmit power for the terminal device, in order for the second radio access network node to set a value of a power regulating parameter as function of the dynamic power threshold and to provide the value of the power regulating parameter to the terminal device for uplink power control of the terminal device, wherein the value of the power regulating parameter is provided to the terminal device from the second radio access network node upon the terminal device having been handed over from the first radio access network node to the second radio access network node.

* * * * *